(12) United States Patent
Itoh

(10) Patent No.: US 7,949,184 B2
(45) Date of Patent: May 24, 2011

(54) IMAGE PROCESSING APPARATUS, IMAGE PROCESSING METHOD, AND COMPUTER READABLE MEDIUM AND COMPUTER DATA SIGNAL FOR PROCESSING IMAGE

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 991 days.

(21) Appl. No.: 11/822,409

(22) Filed: Jul. 5, 2007

(65) Prior Publication Data

US 2008/0069442 A1    Mar. 20, 2008

(30) Foreign Application Priority Data

Aug. 8, 2006  (JP) ................................. 2006-216278
Apr. 5, 2007  (JP) ................................. 2007-099880

(51) Int. Cl.
*G06K 9/00* (2006.01)
*G06K 9/36* (2006.01)

(52) U.S. Cl. ........ 382/167; 382/162; 382/166; 382/168; 382/172

(58) Field of Classification Search .................. None
See application file for complete search history.

(56) References Cited

U.S. PATENT DOCUMENTS

| 5,142,272 | A | * | 8/1992 | Kondo | 345/550 |
| 5,307,182 | A | * | 4/1994 | Maltz | 358/518 |
| 5,459,797 | A | * | 10/1995 | Sato | 382/165 |
| 6,483,940 | B1 | * | 11/2002 | Wang | 382/164 |
| 2004/0076337 | A1 | * | 4/2004 | Nishida | 382/274 |
| 2005/0100212 | A1 | * | 5/2005 | Eguchi et al. | 382/164 |
| 2007/0242878 | A1 | * | 10/2007 | Maxwell et al. | 382/168 |

FOREIGN PATENT DOCUMENTS

JP    A-05-061974    3/1993

* cited by examiner

*Primary Examiner* — Samir A Ahmed
*Assistant Examiner* — Li Liu
(74) *Attorney, Agent, or Firm* — Oliff & Berridge, PLC

(57) ABSTRACT

An image processing apparatus includes: a unit producing a histogram in a color space from an input image; a unit extracting a plurality of peak colors having a local maximum frequency of appearance of a color value in the histogram; a unit determining whether to unify the extracted plurality of peak colors, based on a feature amount of the extracted plurality of peak colors, and selecting a peak color as a representative color when the extracted plurality of peak colors are unified, the feature amount being a lightness difference among the extracted plurality of peak colors and directions of vectors in the color space, the vectors each showing a shortest distance from one of the extracted plurality of peak colors to a line segment connecting between a reference color and a dark color; and a unit replacing a color of each pixel in the input image by the representative color.

8 Claims, 15 Drawing Sheets

PEAK COLOR

PAPER COLOR

| | | | -1 | -1 |
|---|---|---|---|---|
| | 2 | | | -1 |
| | | 2 | | |
| -1 | | | 2 | |
| -1 | -1 | | | |

FIG. 11A
FIG. 11B
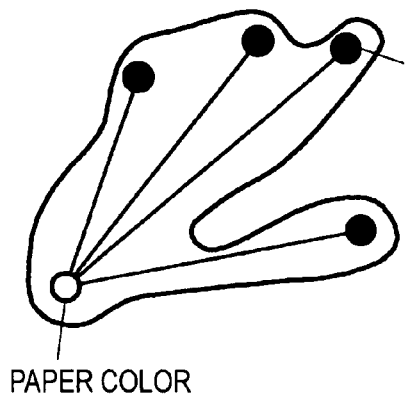
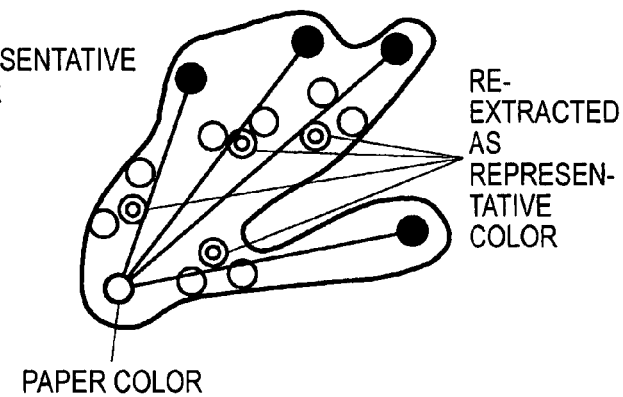

| -1 | -0.75 | -0.5 | -0.25 | 0 |
|---|---|---|---|---|
| -0.75 | -0.5 | -0.25 | 0 | 0.25 |
| -0.5 | -0.25 | 0 | 0.25 | 0.5 |
| -0.25 | 0 | 0.25 | 0.5 | 0.75 |
| 0 | 0.25 | 0.5 | 0.75 | 1 |

IMAGE PROCESSING APPARATUS, IMAGE PROCESSING METHOD, AND COMPUTER READABLE MEDIUM AND COMPUTER DATA SIGNAL FOR PROCESSING IMAGE

CROSS-REFERENCE TO RELATED APPLICATION

This application is based on and claims priority under 35 USC §119 from Japanese Patent Application Nos. 2006-216278 and 2007-99880, filed Aug. 8, 2006 and Apr. 5, 2007, respectively.

BACKGROUND (i) Technical Field

The present invention relates to an image processing apparatus, an image processing method, and a computer readable medium and computer data signal for processing image.

(ii) Related Art

In the related art, it is a practice to implement a color-limiting process to reduce the number of colors in use on an image. The color-limiting process allows for reducing the various noises and irregularities contained in the image, e.g. printing irregularities on the original and scanning noises caused in reading out where the image is a read one out of the original by means of an image reader, and hand-written irregularities where hand-written ones are included. Meanwhile, in compressing the image, the process can reduce compression noises while improving the ratio of compression.

The color-limiting process is to be realized by selecting some number of representative colors out of the colors used in the image and then replacing the colors of the image into the representative colors.

SUMMARY

According to one aspect of the present invention, there is provided an image processing apparatus comprising: a histogram producing unit that produces a histogram in a color space from an input image; a peak-color extracting unit that extracts a plurality of peak colors having a local maximum frequency of appearance of a color value in the histogram; a representative-color selecting unit that determines whether to unify the extracted plurality of peak colors, based on a feature amount of the extracted plurality of peak colors, and that selects a peak color as a representative color among the extracted plurality of peak colors when the plurality of peak colors are unified, the feature amount comprising a lightness difference among the extracted plurality of peak colors and directions of vectors in the color space, the vectors each showing a shortest distance from one of the extracted plurality of peak colors to a line segment connecting between a reference color and a dark color; and a replacing unit that replaces a color of each pixel in the input image by the representative color.

BRIEF DESCRIPTION OF THE DRAWINGS

Exemplary Embodiments of the present invention will be described in detail based on the following figures, wherein:

FIGS. 11A and 11B are explanatory figures showing another exemplary example of unifying peak colors at the representative-color extracting section 42;

DETAILED DESCRIPTION

Exemplary embodiments of the invention will be discussed with reference to the accompanying drawings.

Figure 1:
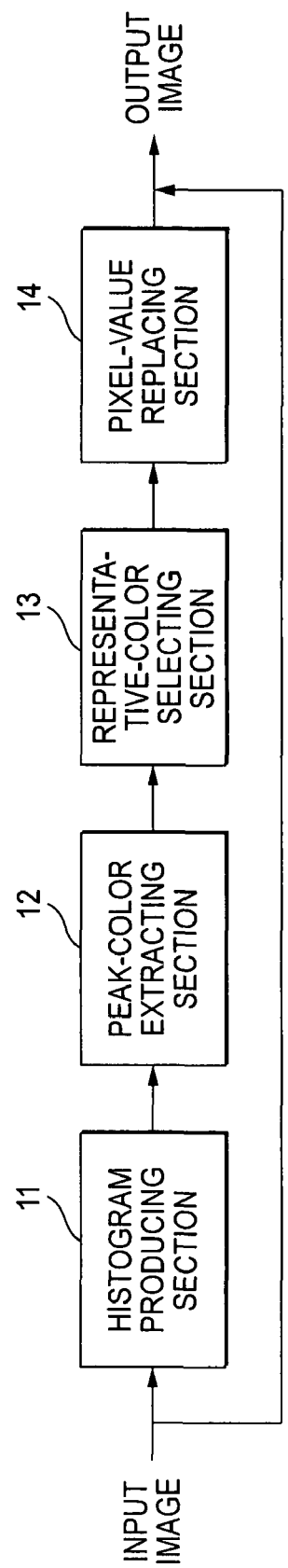
FIG. 1 is a block diagram showing a first exemplary embodiment of the invention.

FIG. 1 is a block diagram showing a first exemplary embodiment of the present invention. In FIG. 1, 11 is a histogram producing section, 12 is a peak-color extracting section, 13 is a representative-color selecting section and 14 is a pixel-value replacing section. The histogram producing section 11 counts a color value in each pixel in an input image and prepares a histogram in a color space.

The peak-color extracting section 12 extracts a peak color maximal (local maximal) in frequency, among the histogram prepared by the histogram producing section 11. Incidentally, when extracting the peak color, also specified is another peak color that is a reference color (e.g., a paper color).

The representative-color selecting section 13 determines whether or not to unify a plurality of peak colors, based on a feature amount of the plurality of peak colors extracted by the peak-color extracting section 12. The representative-color selecting section 13 also selects a peak color to be left, as a representative color among the plurality of peak colors to unify. Whether or not to unify a peak color can be determined based on, as the feature amount, a lightness difference among the plurality of peak colors and directions of vectors in the color space, the vectors representing a shortest distance from each peak color to a line segment connecting between the reference color and a dark color (e.g., a black color). Meanwhile, when the plurality of peak colors are unified, it is possible to determine which one of the peak colors is allowed to be left upon unifying, based on at least one of a color saturation, a hue, a lightness, a frequency and a differential value of frequency, of the peak color.

Incidentally, a peak color, specified at the peak-color extracting section 12, can be used as the reference color (a paper color) that provides an end point of the line segment for defining the vector. Meanwhile, as for the dark color, it is possible to determine whether or not a peak color lowest in lightness of the peak colors can be regarded as black, and to set the peak color as a black color in the case the peak color lowest in lightness can be regarded as black or to set an arbitrary black color in the case the peak color lowest lightness cannot be regarded as black.

The pixel-value replacing section 14 replaces pixel-based colors of the input image by the representative colors selected by the representative-color selecting section 13. Due to this, the input image is limited in its used colors to the representative colors, thus effecting a process of color limitation.

Figure 2A:
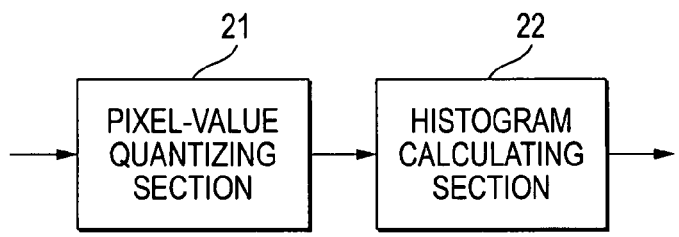
FIGS. 2A to 2C are figures to explain an exemplary example of a histogram producing section.

Explanation is made continuously on the above configuration. FIG. 2A is an explanatory figure of an exemplary example of the histogram producing section. In the figure, 2 is a pixel-value quantizing section and 22 is a histogram calculating section. The histogram, in a color space, may be determined by counting the number of pixels on a color value-by-color value basis. However, because the data will be huge in amount, shown here is an example to count the number of pixels by gathering the color values in a certain range.

Figure 2B:
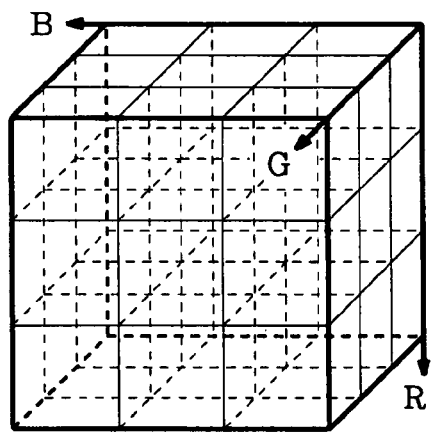

In the configuration example shown in FIG. 2A, the histogram producing section 11 has a pixel value quantizing section 21 and a histogram calculating section 22. The pixel-value quantizing section 21 quantizes a color value in each pixel. For example, by rounding down the lower-order several bits as to each color component, quantization can be made on the color value. FIG. 2B shows an exemplary example to count the number of pixels as to the blocks of 3×3×3 within the entire RGB color space by dividing color components (R, G, B) into three parts in the RGB space. Naturally, although this example illustrates to make a counting based on rough blocks divided less in the number for the sake of illustration, the actual accuracy of quantization can be established desirably. For example, in an image read by a scanner, there is a possible occurrence of delicate color dissimilarity on a domain of the image despite the domain is uniform in color on the original image. In also such a case, a merit is available that delicately dissimilarities of colors can be gathered together in an equal color value by quantizing the pixel value at the on-pixel value quantizing section 2.

Figure 2C:
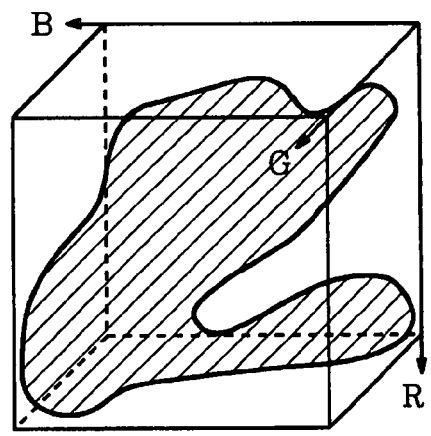

The histogram calculating section 22 counts the quantized color value and prepares a three-dimensional histogram on a color space. FIG. 2C shows an exemplary example of a histogram distribution in an RGB color space. By counting the pixel-based quantized color values, the resulting count values (other than 0) in most cases come in a distribution in a part of the color space, as shown by the hatching. In the explanation from now on, there are shown only a partial space where distribution is with other count values than 0.

Figure 3A:
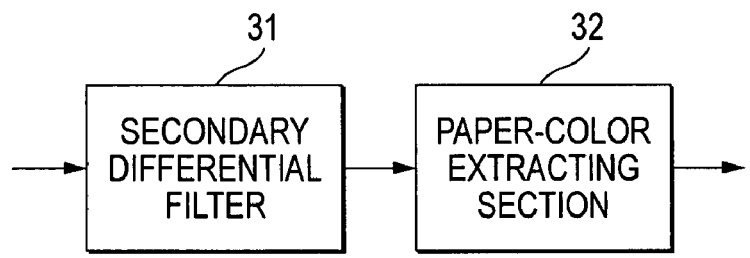
FIGS. 3A to 3C are figures to explain an exemplary example of a peak-color extracting section.
Figure 3B:
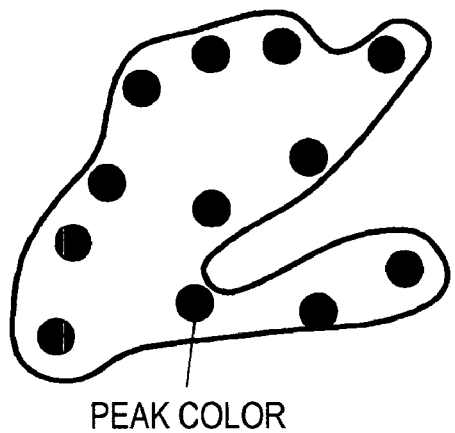
Figure 3C:
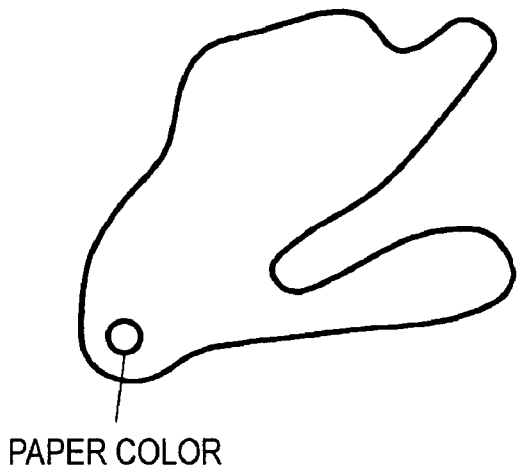

FIGS. 3A to 3C are explanatory figures of an exemplary example of the peak-color extracting section 12. In FIG. 3A, 31 is a secondary differential filter and 32 is a paper-color extracting section. As noted before, the peak-color extracting section extracts a peak color maximal in frequency, from the three-dimensional histogram prepared at the histogram producing section 11. For a configuration for such a purpose, a secondary differential filter 31 is provided. By performing a three-dimensional processing of secondary differential filtering on the three-dimensional histogram by means of the secondary differential filter 31, maximal values (peak colors) can be extracted out of the three-dimensional histogram. For the secondary differential filter 31, techniques in the related art can be applied. Naturally, a peak color may be extracted by another processing than that of the secondary differential filter, e.g. primary differential filtering. Otherwise, a plurality of peak-color extraction processes can be combined in use.

The peak colors, extracted by the secondary differential filter 31, are denoted at black circles in FIG. 3B. The main colors used in the input image, the colors particularly different in hue from others, etc. are extracted as peak colors.

In this example, the peak-color extracting section 12 is provided with a paper-color extracting section 32 to extract a paper color. The paper-color extracting section 32 is to cope with also the case the background color is not white, e.g. image read out of an original document such as a newspaper or a colored paper. The paper-color extracting section 32 is allowed to specify a paper color by means of a function having parameters of the secondary differential value and lightness obtained by the secondary differential filter 31. In many cases, the color of image background is high in frequency so that one of the peak colors obtained at the secondary differential filter 31 can be extracted as a paper color. Naturally, background-color extraction process may be performed separately. Alternatively, a predetermined color can be taken as a paper color, to provide a configuration without providing such a paper-color extracting section 32. The color, extracted as a paper color, is shown at a white circle in FIG. 3C.

Figure 4:
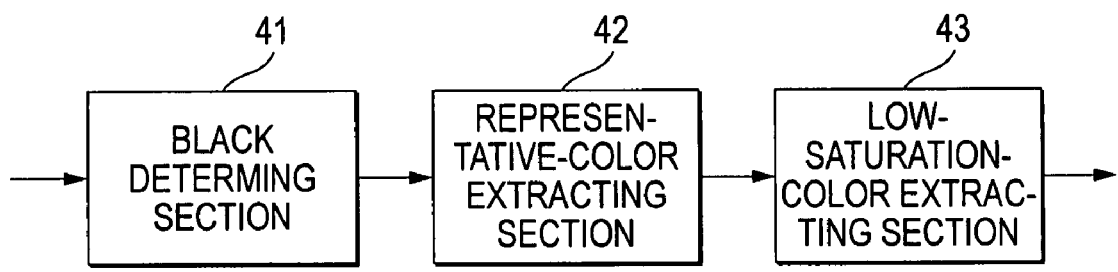
FIG. 4 is a block diagram showing an exemplary example of a representative-color selecting section.

FIG. 4 is a block diagram showing an example of the representative-color selecting section 13. In FIG. 4, 41 is a black determining section, 42 is a representative-color extracting section and 43 is a low-saturation-color excluding section. As noted before, the representative-color selecting section 13 selects a representative color, to replace the pixel of the input image, out of the peak colors extracted by the peak-color extracting section 12. For a configuration for that purpose, the example shown in FIG. 4 has a black determining section 41, a representative-color extracting section 42 and a low-saturation-color extracting section 43.

The black determining section 41 sets up a black color that is to be connected through a line segment to the paper color at the representative-color extracting section 42. At first, determination is made as to whether or not a peak color, lowest in lightness of the peak colors extracted at the peak-color extracting section 12, can be regarded as black. For example, determination can be made under such a condition with a lightness being in a value or smaller. When the peak color can be regarded as black, the peak color is established as black. On the contrary, when the peak color cannot be regarded as black, a black color is set up. For example, the black color may be set up for an image not using black.

The representative-color extracting section 42 extracts a representative color out of the peak colors extracted at the peak-color extracting section, by use of the black color established at the black determining section 41. In extracting a representative color, a line segment connecting between the paper color and the black color is used for determining a vector representing a shortest distance between the line segment and the peak color. Using a direction of the vector and lightness difference, similar colors are gathered together. Simultaneously, determination is made as to which color is to be left as a representative color out of the peak colors to unify. Detailed process is described later.

The low-saturation-color excluding section 43 excludes low-saturation colors out of the extracted representative colors and to determine a representative color. Because a low-saturation color in most cases falls under gray and hence can be replaced, as a representative color, with black. Meanwhile, low saturation colors exist in positions close to a lightness axis or a pseudo lightness axis. Since hue in this region changes greatly in value, the representative-color extracting section 42 possibly makes an erroneous extraction. Accordingly, representative colors having low saturation are deleted here. Naturally, this process may be omitted.

Figure 5:
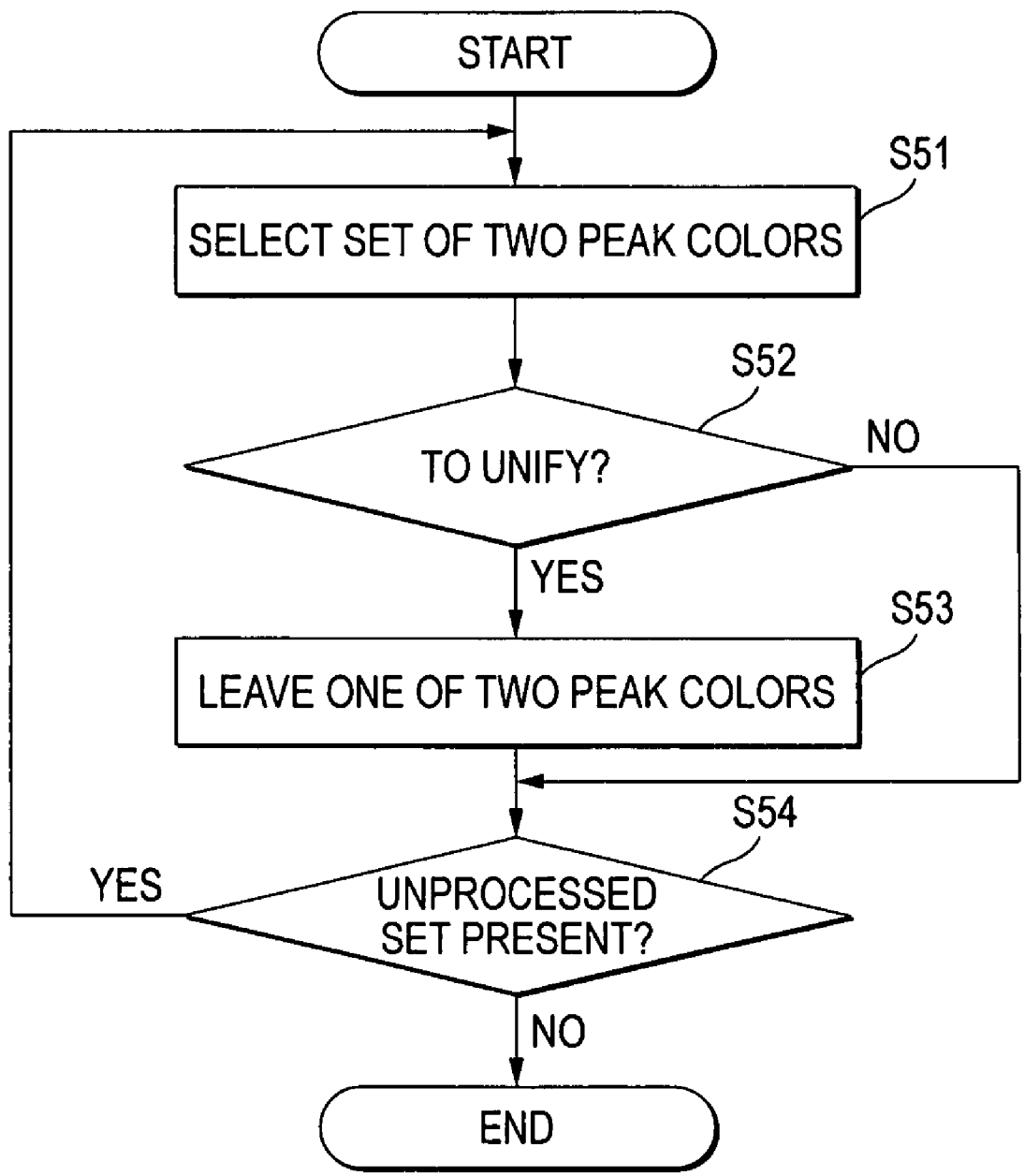
FIG. 5 is a flowchart showing an exemplary example of operation of a representative-color extracting section 42.

The representative-color extracting section 42 is further explained. FIG. 5 is a flowchart showing an operation example of the representative-color extracting section 42. At S51, a set of two peak colors unprocessed is selected out of the peak colors extracted at the peak-color extracting section 12.

Figure 6:
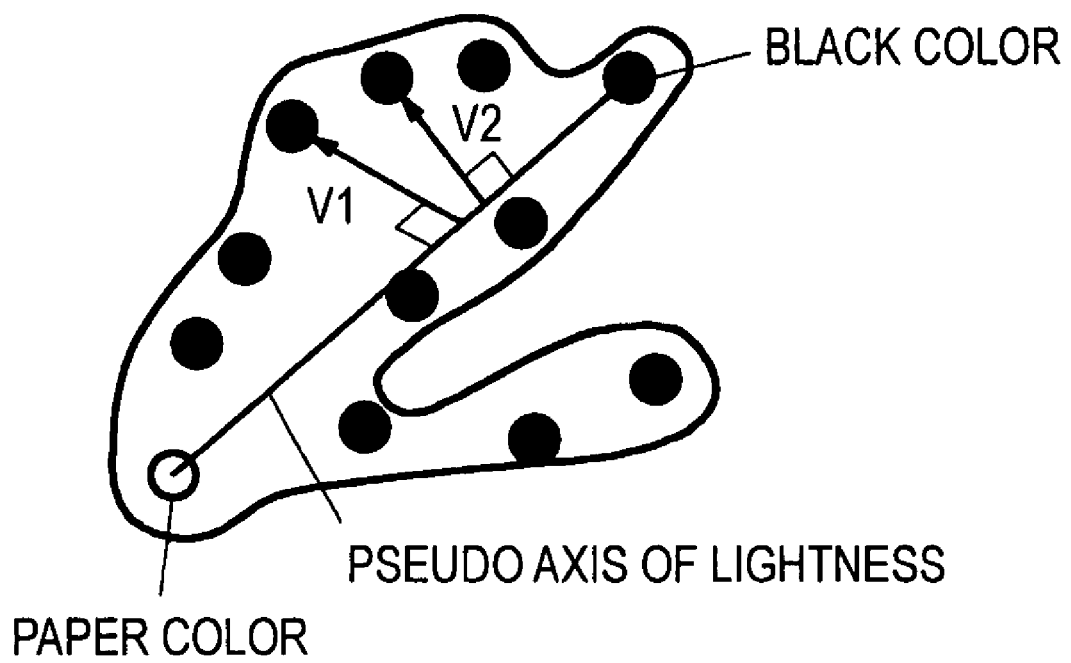
FIG. 6 is an explanatory figure of an exemplary example of a peak-color unifying process at the representative-color extracting section 42.

At S52, determination is made as to whether or not to unify the two peak colors. The determination, as to whether or not to unify the peak colors, may be performed in the following way. FIG. 6 is an exemplification figure of a unifying process of peak colors at the representative-color extracting section 42. At first, in a color space, a line segment connects between a paper color and a black color. This line segment can be considered as a pseudo lightness axis though not always coincident with the lightness axis because the paper color is not necessarily white. Vectors are determined that are the shortest in distance from the line segment to the two peak colors under processing. In FIG. 6, those are shown as vectors V1, V2.

As for the relationship between the vectors V1 and V2, first determined is an angle $\Delta\theta$ defined between the vectors V1 and V2. The angle $\Delta\theta$ is indicative of a difference amount in hue relative to the pseudo lightness axis. Where the difference amount is small, the colors are highly possibly similar to each other and hence are to be united together.

Meanwhile, a lightness difference $\Delta L^*$ between the two peak colors is determine. Where the lightness difference is small, the colors are highly possibly similar to each other and hence are to be unified.

From the angle $\Delta\theta$ and lightness difference $\Delta L^*$ thus obtained, determination is made comprehensively as to whether or not to unify the two peak colors. Namely, where there is a great difference in lightness despite small is the angle $\Delta\theta$ indicative of a hue difference amount, those in many cases are to be recognized as different colors. Meanwhile, where there is a great difference in hue even if small in lightness difference $\Delta L^*$, those are naturally recognized as different colors. For this reason, when the both are small, the two peak colors can be determined to be unified. Specifically, the following is provided as an evaluation function:

$$H = a \times \Delta\theta + b \times \Delta L^* \ (a, b: \text{constants}).$$

In the case the value H calculated is smaller than a threshold, determination can be made for unifying.

In the case determined not to unify at s52, the process proceeds to S54. When determined to unify, one of the two peak colors to unify is deleted while the other is left at S53, thus making a unifying substantially to the left peak color. How to determine which one is to be left can use a color saturation, a hue, a lightness, a frequency and a differential value of frequency or the like of the peak color to unify. Specifically, the length |V1|, |V2| of the vector V1, V2 determined before can be used for the color saturation. Provided that the frequency (histogram count value) of the peak color is freq(V1) and freq(V2) while the differential value of the frequency is (freq(V1) and (freq(v2)), G1 and G2 are calculated by means of an evaluation function Gi given in the following:

$$Gi = c \times |Vi| + d \times \text{freq}(Vi) + e \times (\text{freq}(Vi))'$$

where c, d and e are constants while i=1, 2. If G1>G2 is held when comparing between G1 and G2 calculated, the peak color corresponding to G1 is determined to be left. If G1≦G2, the peak color corresponding to G2 is determined to be left. The other peak colors, than those determined left, are deleted.

At S54, it is determined whether or not there is left a set of two unprocessed peak colors. If there is a left one, the process returns to S51 where the process is repeated for the unprocessed set. After processed on all the sets, the processing at the representative-color extracting section 42 is ended.

Figure 7:
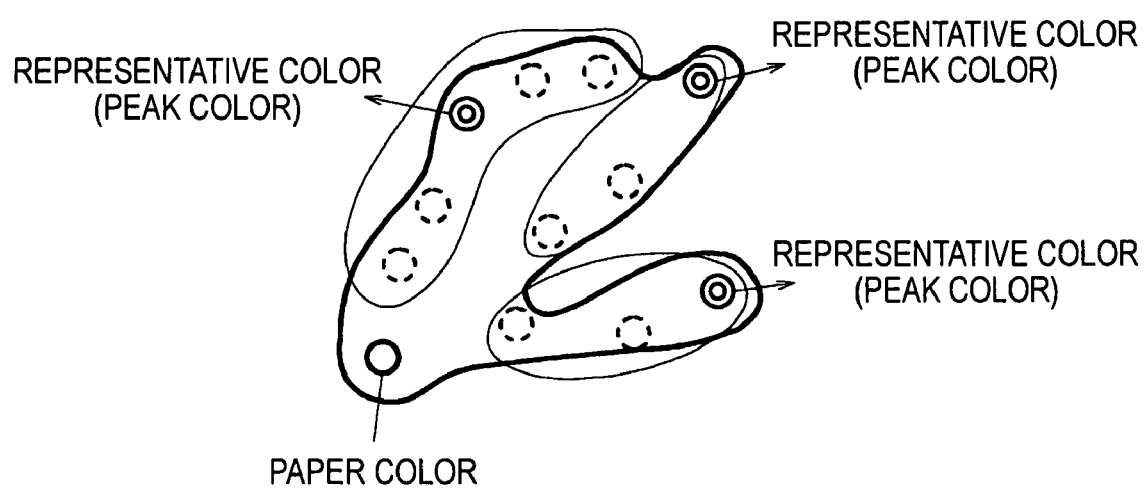
FIG. 7 is an explanatory figure of an exemplary example of a peak-color unifying-processed at the representative-color extracting section 42.

FIG. 7 is an explanatory figure of an example of the peak color unite-processed at the representative-color extracting section 42. The similar peak colors, of the FIG. 6 peak colors other than those in paper and black colors, are unified into the peak colors shown at double circles in FIG. 7. The deleted peak colors are shown at broken-lined circles.

The peak colors left in the unifying process are extracted as representative colors and taken as outputs of from the representative-color extracting section 42. Of the extracted representative colors, the representative colors having low saturations are excluded by the low-saturation-color excluding section 43. The representative colors left are provided as selected representative colors by the representative-color selecting section 13. Incidentally, the paper and black colors are left as representative colors. In this manner, the color arrangement in the input image can be correctly determined as representative colors.

In the foregoing representative-color extracting method, a peak color was extracted as a representative color which is different in the direction of a vector indicative of a shortest distance between the pseudo lightness axis and each peak color to process or is distant in position therefrom. Accordingly, the peak colors, existing intermediately on a vector corresponding to a representative color, are unified instead of being extracted. Those colors, in positions close to the pseudo lightness axis, are also not extracted but excluded by the low-saturation-color extracting section 43. Of among the peal colors not extracted but unified, there is possibly included a color to be desirably extracted as a representative color. Now explanation is made on a method of additionally extracting a representative color.

Figure 8:
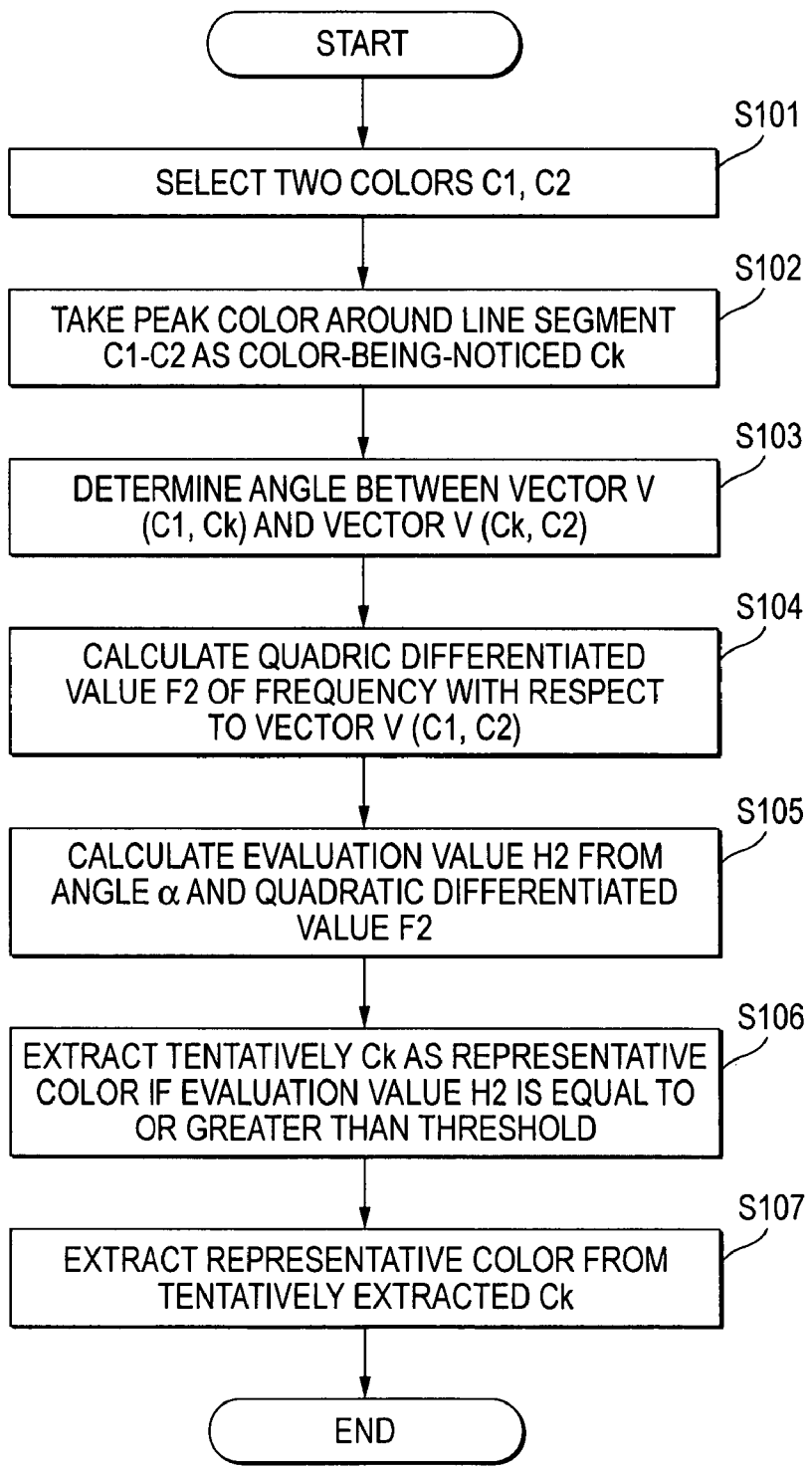
FIG. 8 is a flowchart showing an exemplary example of additional extraction of a representative color.
Figures 9A, 9B:
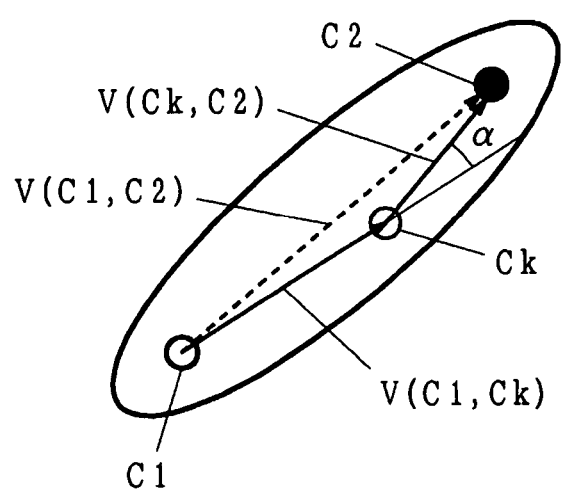
FIGS. 9A and 9B are explanatory figures showing an exemplary example of additional extraction of a representative color.

FIG. 8 is a flowchart showing an exemplary example of a process to additionally extract a representative color. FIGS. 9A and 9B are explanatory figures on a process example to additionally extract a representative color. At first, at S101 in FIG. 8, a region is established where to perform re-extraction. Such a region is established by setting up colors C1, C2. Of the peak colors existing close to a line segment connecting between the colors C1, C2, if there is a color to take as a representative color, the relevant color is extracted. Where to add a representative color close to the pseudo lightness axis, the colors C1, C2 are respectively taken with a paper color and a black. Meanwhile, where to add as a representative color a color intermediately on a line segment indicative of a shortest distance between a pseudo lightness axis and a representative color, the colors C1, C2 are respectively taken with a projection point of the representative color onto the pseudo lightness axis and the respective color.

At S102, a peak color existing close to the line segment connecting between the colors C1, C2 is taken as a color-being-noticed Ck. For example, it is possible to take a peak color Ck, existing in a distance range from the line segment connecting between the colors C1, C2, as a color-being-noticed Ck. There are cases that a plurality of peak colors exist close to the line segment connecting between the colors C1 and C2. In such a case, steps S103 to S106, explained in the following, are executed by considering those as colors-being-noticed Ck.

At S103, determined is an angle α defined between a vector V (C1, Ck) and a vector V (Ck, C2). FIG. 9A illustrates the relationship between the colors C1, C2, Ck, the vectors and the angle α. The color-being-noticed Ck is a color in a position close to the line segment connecting between the colors C1 and C2. In this case, by determining the angle α defined between the vector V (C1, Ck) and the vector V (Ck, C2), the angle α shown is determined. The angle α decreases when the color-being-noticed Ck is closer to the line segment C1-C2. Even where distant equally from the line segment, the angle α is smaller in a position intermediate between the colors C1 and C2. For example, if it exists besides the color C1, the vector V (C1, Ck) has an increasing angle with the line segment, thus providing the angle α greater. Likewise, if the color Ck is besides the color C2, the vector (Ck, C2) and the line segment give a greater angle, thus providing the angle α greater.

At step S104, a quadric differentiated value F2 of frequency is determined on the color-being-noticed Ck with respect to a direction of the line segment (direction of the vector (C1, C2)). As for a frequency distribution, it is possible to use a three-dimensional histogram prepared at the histogram producing section 11. Meanwhile, the quadric differentiated value may be calculated by use of a filter, as shown in FIG. 9B. Incidentally, although the filter is practically three-dimensional, it is shown here in a two dimensional form for the sake of convenience. Meanwhile, FIG. 9B shows an example of a coefficient matrix of a two-dimensional differential filter, at an angle of 45 degrees corresponding to the line segment C102 shown in FIG. 9A. The coefficients differ depending upon the direction of the line segment. Meanwhile, the filter is desirable in size. The quadratic differentiated value F2 represents at what degree the color-being-noticed Ck, as a peak color, is used distinct as compared to the surrounding colors.

At S105, an evaluation value H2 is determined from the angle α determined at the S103 and the quadratic differentiated value F2 determined at the S104. The evaluation value H2 is calculated by an evaluating function that outputs a greater value as the angle α is smaller and the quadratic differentiated value F2 is greater, for example. Incidentally, the evaluation value H2 may be normalized at the frequency value of the color-being-noticed Ck.

At S106, the estimated value H2, calculated at the S105, is compared with a threshold. When the estimated value H2 is greater than the threshold, the color-being-noticed Ck is tentatively extracted as a representative color. Incidentally, where there are a plurality of peak colors in positions close to the line segment C102 as in the foregoing, the steps of from S103 to S106 are carried out by taking the peak colors as representative colors Ck. Due to this, the color-being-noticed Ck, to be tentatively extracted as a representative color, is not limited to one in the number but possibly be extracted in plurality. Naturally, there are cases that nothing be extracted at a certain extracted value H2.

At S107, in the case there are a plurality of colors-being-noticed Ck tentatively extracted as representative colors at S106, those in positions near to one another on a color space (e.g. those within a predetermined threshold) are grouped together. Of the colors-being-noticed Ck belonging to the same group, the greatest one in the estimated value H2 is additionally extracted as a representative color. Otherwise, by selecting desired two out of the colors-being-noticed Ck belonging to the same group, the peak color greater in the estimated value H2 is left as a representative-color candidate when existing within a constant distance on the color space while the other peak color is excluded from the representative-color candidate. The procedure may be repeated to extract the remaining representative-color candidate as a representative color. In this manner, additionally extracted is a color that was existent on the line segment C1-C2 and to be extracted as a representative color.

Incidentally, the representative-color additional extraction shown in FIG. 8 may be performed plurality in number of times by changing the colors C1, C2 to select at the S101. For example, it is possible to extract a gray representative color by selecting paper and black colors as colors C1, C2, and to additionally extract representative colors respectively from the representative colors extracted at the representative-color extracting section 42 and the projection points of the representative colors onto the pseudo lightness axis. In this case, the representative-color additional extraction may be made on all the representative colors extracted at the representative-color extracting section 42. This makes it possible to additionally extract a representative color even where there are a plurality of colors that are equal in hue but representative colors are not to be perfectly extracted by the representative-color extracting section 42. Meanwhile, in additional extraction of a gray representative color, the representative-color extracting section 42 makes an accurate extraction of the low-saturation representative colors excluded by the low-saturation-color excluding section 43, including those erroneously detected at the representative-color extracting section 42.

Figure 10A:
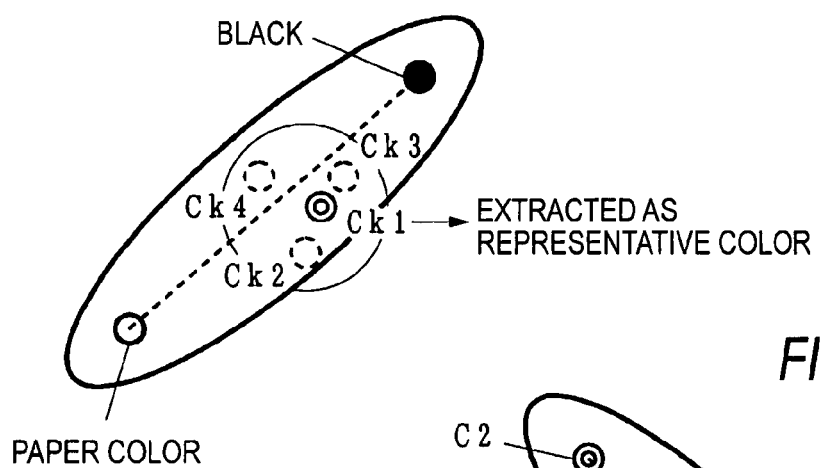
FIGS. 10A and 10B are explanatory figures showing an exemplary example of a representative color to additionally extract.
Figure 10B:
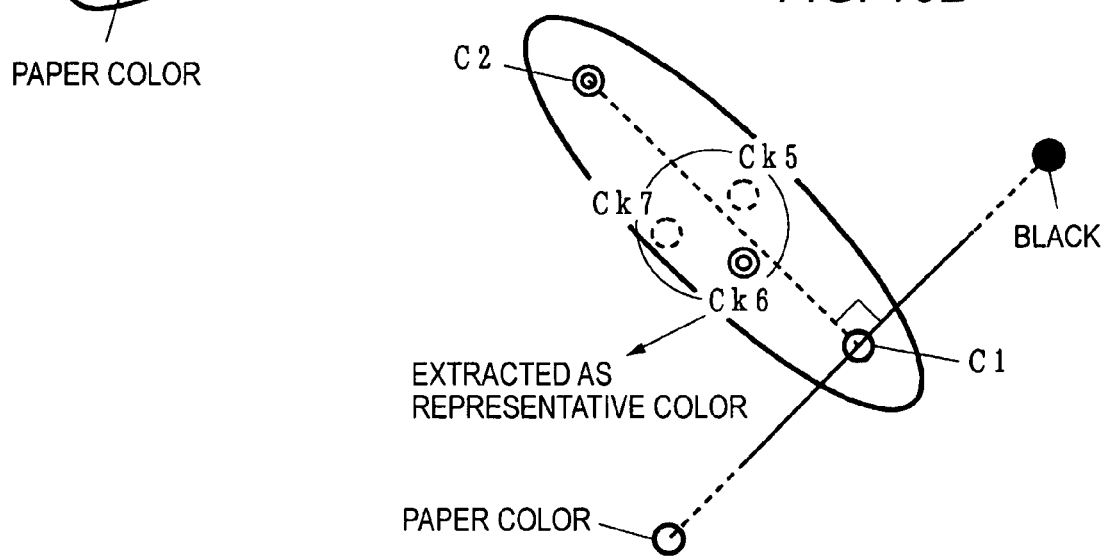

FIGS. 10A and 10B are explanatory figures showing an exemplary example of a representative color to additionally extract. FIG. 10A shows a case that paper and black colors are selected respectively as colors C1, C2, showing an example that peak colors Ck1-Ck4 exist close to a line segment. In the example, peak colors Ck1-Ck4 are respectively taken as colors-being-noticed, to execute steps S103-S106. Extracted tentatively are those whose evaluated values H2, corresponding to the peak colors Ck1-Ck4, are greater than a threshold. For example, the four are assumed tentatively extracted as representative colors. Because the four peak colors are such mutually approximate colors as within a given distance on a color space, the four peak colors are grouped together to extract the greatest one in estimated value H2 as a representative color. For example, assuming that the peak color Ck1 has the greatest estimated value H2, the peak color Ck1 is extracted as a representative color while the other peak colors Ck2-Ck4 are not taken as a peak color. Otherwise, by selecting desired two out of the peak colors Ck1-Ck4, the peak color having a greater estimated value H2 is left as a representative color when those are within a given distance on the color space while the other peak color is excluded from the representative-color candidate. The procedure is repeated to extract the remaining representative-color candidate (peak color Ck1, in this case) as a representative color. In this manner, the peak color Ck1 could be additionally extracted as a representative color on the case that paper and black colors were respectively selected as colors C1, C2.

FIG. 10B shows a case that a color C2 is selected with a representative color extracted at the representative-color extracting section 42 and a color C1 with a projection point of the representative color thereof onto a pseudo lightness axis. In this example, peak colors Ck5-Ck7 are shown existing in positions close to a line C1-C2. Because the peak colors Ck5-Ck7 has a vector, indicative of a shortest distance to the pseudo lightness axis, that is in the same direction as a vector indicative of a shortest distance of the representative color C2 to the pseudo lightness axis, those are to be united together by the representative-color extracting section 42.

In also this example, the peak colors Ck5-Ck7 are respectively taken as colors-being-noticed, to execute the steps S103-S106. For example, it is assumed that the evaluated values H2 corresponding to the peak colors Ck1-Ck4 are greater than a threshold wherein all the three have been tentatively extracted as representative colors. Because the three peak colors are colors approximate one to another, the three peak colors are grouped together to extract as a representative color the greatest one in estimated value H2. For example, assuming that the peak color Ck6 has the greatest estimated value H2, the peak color Ck6 is extracted as a representative color while the other peak colors Ck5, Ck7 are not selected as a representative color. Otherwise, by selecting desired two out of the peak colors Ck5-Ck7, the peak color having a greater estimated value H2 is left as a representative color when those are within a given distance on the color space while the other peak color is excluded from the representative-color candidate. The procedure is repeated to extract the remaining representative-color candidate (peak color Ck6, in this case) as a representative color. In this manner, the peak color Ck1 could be additionally extracted as a representative color on the basis of the representative colors extracted at the representative-color extracting section 42.

FIGS. 11A and 11B are explanatory figures showing another example to unite peak colors together at the representative-color extracting section 42. In this example, a straight line passing through peak and paper colors is considered to unify the peak colors existing close to the straight line. In this case, out of the peak colors to unify, selected is a color distant as greater as possible from the paper color. By thus unifying the peak colors, the remaining peak color is once extracted as a representative color. The representative colors thus extracted are shown at black circles in FIG. 11A.

Such extraction of a representative color has been carried out wherein extraction is not made as to the representative colors existing between the color extracted as a representative color and a paper color. Therefore, by means of the method explained in FIG. 8, a paper color and a selected representative color are respectively selected as colors C1, C2, to additionally extract a representative color.

For example, in the example shown in FIG. 11B, some peak colors shown at dotted-lined circles and double circles exist together at between a paper color and representative colors (black circles). In such a case, if the peak colors shown at dotted-lined and double circles are united with the representative colors shown at black circles, color difference results great. By additionally extracting a representative color from the peak colors existing between each representative color and the paper color by means of the method shown in FIG. 8, the peak color shown at the black circle, for example, is additionally extracted as a representative color. Due to this, besides a color distant as great as possible from the paper color, a color intermediately existing can also be extracted as a representative color that is high in utilization frequency and distinct from other colors.

Figure 12A:
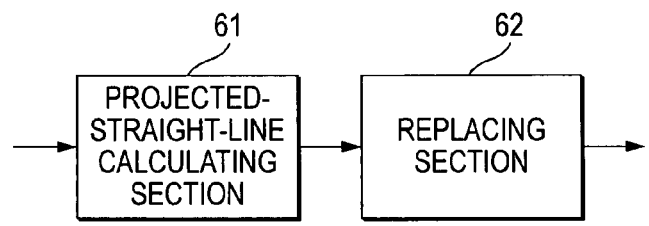
FIGS. 12A to 12C are figures to explain an exemplary example of a pixel-value replacing section 14.
Figure 12B:
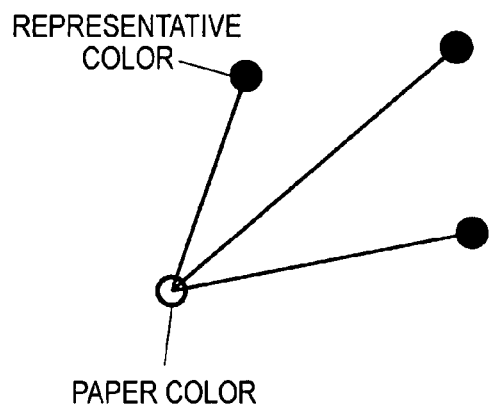
Figure 12C:
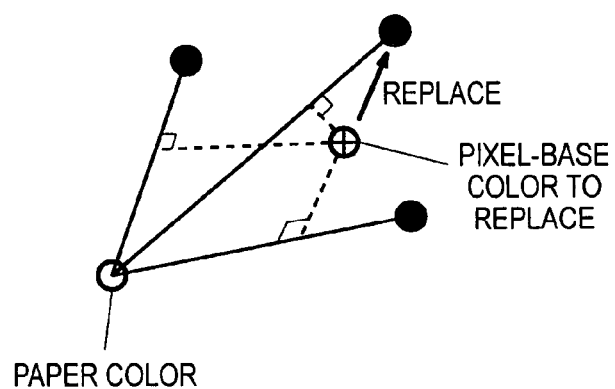

FIGS. 12A to 12C are explanatory figures of an exemplary example of the pixel-value replacing section 14. In FIG. 12A, 61 is a projected-straight-line calculating section and 62 is a replacing section. As noted before, in the pixel-value replacing section 14, the pixel-based color of the input image is replaced with any of the representative colors selected at the representative-color selecting section 13. In order to perform the process, there is a need to select a representative color to replace out of the pixel-based colors of the input image. Showing is made on one method to select such a representative color. Incidentally, in FIGS. 12B and 12C, white circle denotes a paper color, black circle a representative color, and white circle with "+" a color on a pixel where the input image is present.

The projected-straight-line calculating section 61 is to calculate a straight line passing a paper color and another representative color. This straight line is assumed as a projected straight line. FIG. 12B shows straight lines that pass through a paper color denoted by a white circle and other three representative colors than that.

The replacing section 62 determines a distance between each of the projected straight lines calculated at the projected-straight-line calculating section 61 and the pixel-based color of input image to replace. FIG. 12C shows vertical lines of from the pixel-based color to replace onto the projected straight lines. The vertical line has a length that provides a distance of from the pixel-based color to replace to the projected straight line. Selected is a representative color, other than the paper color, corresponding to the shortest projected straight line, to thereby replace the pixel-based color to replace into the selected representative color. Incidentally, as for the color whose distance is in a predetermined range from the paper color, replacement is into the paper color. In this manner, the pixel-based colors of the input image are each replaced into any of the representative colors including the paper color. This provides an output image whose colors in use are limited to the representative colors.

Incidentally, how to select a representative color is not limited to the foregoing method. For example, such a method may be used that an average is determined over the colors surrounding the pixel to replace on the input image, to select a representative color closest in distance to a line segment including a differential vector between the average color and the pixel to replace in the color space or to select a representative color most approximate in color to the pixel to replace when the differential vector gas a length equal to or smaller than a length. Naturally, other various known method may be used.

Figure 13:
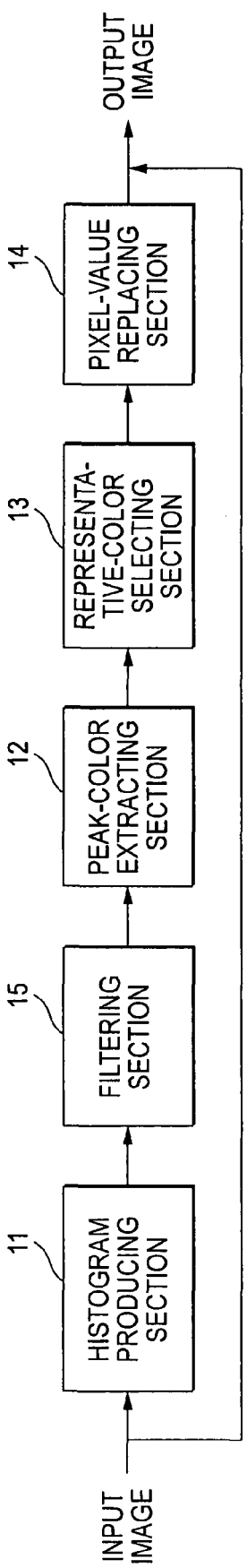
FIG. 13 is a block diagram showing a second exemplary embodiment of the invention.
Figures 14A, 14B:
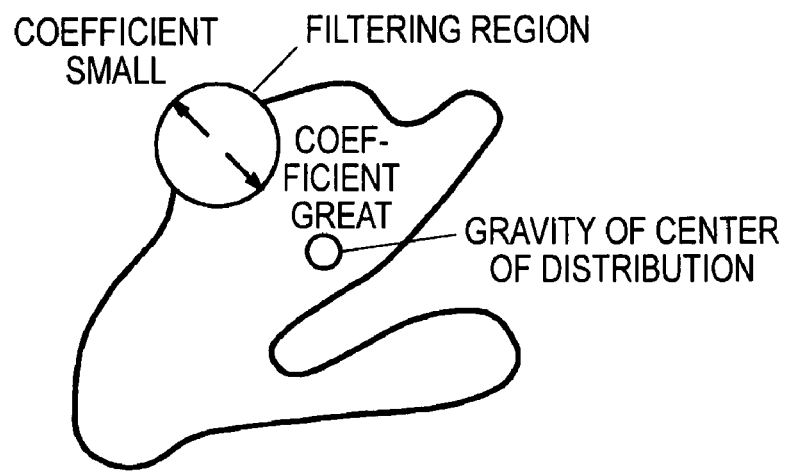
FIGS. 14A and 14B show an exemplary concept of a filter coefficient for a filtering section 15.

FIG. 13 is a block diagram showing a second exemplary embodiment of the invention while FIGS. 14A and 14B are concept figures of a filter coefficient for the filtering section 15. In the figures, the similar element to that of FIG. 1 is attached with the identical reference, to omit the explanation thereof. 15 is a filtering section. The second exemplary embodiment shows a configuration that the filtering section 15 is provided between a histogram producing section 11 and a peak-color extracting section 12.

The filtering section 15 performs a three-dimensionally filtering process for the histogram with a coefficient of the histogram distribution provided greater as nearer to the gravity center of the distribution, say, as shown in FIG. 14A, for the histogram produced at the histogram producing section. For example, where the FIG. 14A a gravity center of a histogram distribution exists in a position 45-degree lower right relative to a subject pixel (central pixel in the filtering region, in this example), it is possible to perform a filtering process by using such a coefficient matrix as shown in a concrete example of FIG. 14B. Although showing herein is merely in a two dimensional for the sake of illustration, filtering is actually with use of a three-dimensional coefficient matrix in accordance with a three-dimensional positional relationship between the gravity center of the distribution and the subject pixel.

The three-dimensionally filtering allows such a region to readily remain that frequency decreases at an end of distribution on a color space and in a direction going away from the center-of-gravity. Due to this, when extracting a peak color at the next peak-color extracting section 12, it can be made easy to extract a peak color existing at the distribution end that in nature has been highly possibly existed on the original. Therefore, the color featured in the input image can be extracted as a peak color and selected as a representative color.

The three-dimensional histogram, filtered in a three-dimensional form at the filtering section 15, is delivered to the peak-color extracting section where a peak color can be extracted out of the three-dimensional histogram. The other configuration is similar to that of the first exemplary embodiment and hence is omitted to explain.

Figure 15:
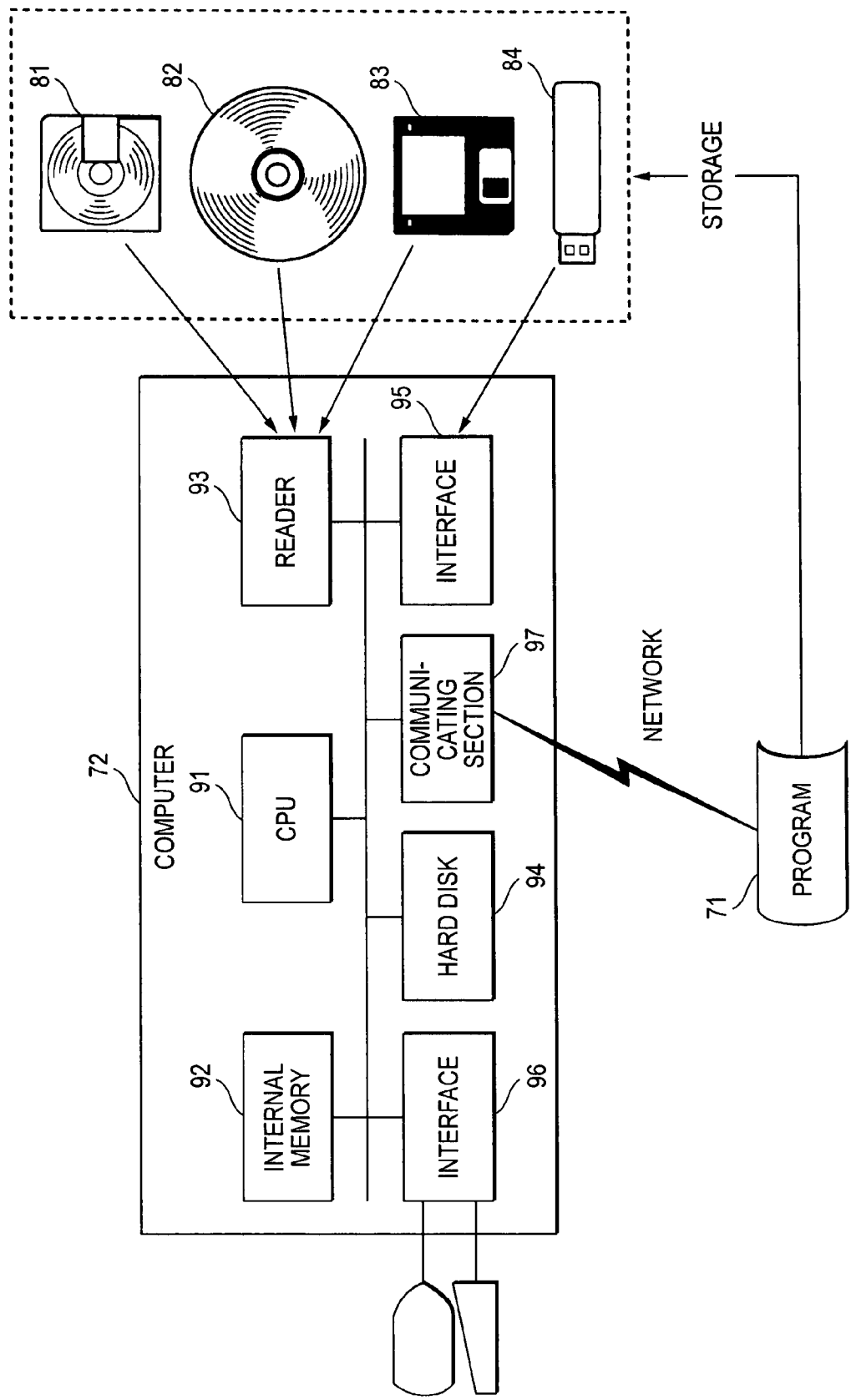
FIG. 15 is an explanatory figure of an exemplary example of a computer program, a storage medium storing such a computer program and a computer, where an image processing apparatus of the invention is realized in its function by means of a computer program.

FIG. 15 is an explanatory figure of an example of a computer program, a storage medium storing such a computer program and a computer, wherein the image processing apparatus of the invention is realized in its function by means of a computer program. In FIG. 15, 71 is a program, 72 is a computer, 81 is a magnetic optical disk, 82 is an optical disk, 83 is a magnetic disk, 84 is a memory, 91 is a CPU, 92 is an internal memory, 93 is a reader, 94 is a hard disk, 95, 96 are interfaces, and 97 is a communicating section.

The image processing apparatus in the invention, explained in the exemplary embodiments and the modifications thereof, can be realized in a part or the entire of the functions of various sections, by means of a program 71 to be executed on a computer. In such a case, the program 71 and the data for the program to use, etc. can be stored on a storage medium to be read out by a computer. The storage medium is something that can cause a change of energy, e.g. in magnet, light or electricity, at the reader 93 provided in the computer hardware resource in accordance with a description form of a program, and transfer the description content of the program to the reader 93. For example, it may be a magnetic optical disk 81, an optical disk 82 (including a CD, a DVD and the like), a magnetic disk 83, a memory (including an IC card, a memory card and the like), or the like. Naturally, the storage mediums are not limited to those transportable in type.

By storing the program 71 in such a storage medium and placing the storage medium in a reader 93 or interface 95 of the computer 72, the program 71 can be read out on the computer and stored in the internal memory 92 or hard disk 94. By executing the program 71 by means of the CPU 91, realized is the function of the image processing apparatus of the invention. Otherwise, the function of the image processing apparatus of the invention may be realized as in the following. Namely, by transferring the program 71 onto the computer 72 through a network, the computer 72 can receive the program 71 at its communicating section 97 and store it in the internal memory 92 or hard disk 94 thereby executing the program 71 by means of the CPU 91. Incidentally, the computer may be connected with other various devices through the interface 96, e.g. a display for displaying information and an input device for the user to input information.

Naturally, part of the functions can be structured by hardware or all of those may be structured by hardware. Otherwise, it is also possible to configure a program including the invention together with other structure. For example, configuration is possible as one program together with a control program in an apparatus including an image reading device and image forming device, e.g. copier, in a manner to process for color limitation as to the image read out by the image reading device. Naturally, in the application for other purpose, integration is possible with the program for the relevant use. Incidentally, it is needless to say that the computer 72 may be arranged having any or both of the image reading device and the image forming device or other configurations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a histogram producing device configured to produce a histogram in a color space from an input image;
    a peak-color extracting device configured to extract a plurality of peak colors having a local maximum frequency of appearance of a color value in the histogram;
    a representative-color selecting device configured to determine whether to unify the extracted plurality of peak colors, based on a feature amount of the extracted plurality of peak colors, and that selects a peak color as a representative color among the extracted plurality of peak colors when the extracted plurality of peak colors are unified, the feature amount comprising a lightness difference among the extracted plurality of peak colors and directions of vectors in the color space, the vectors each showing a shortest distance from one of the extracted plurality of peak colors to a line segment connecting between a reference color and a dark color; and
    a replacing device configured to replace a color of each pixel in the input image by the representative color.

2. The image processing apparatus according to claim 1, wherein the representative-color selecting device selects the peak color as the representative color based on at least one of a color saturation, a hue, a lightness, a frequency and a differential value of frequency, of the peak color.

3. The image processing apparatus according to claim 1, wherein the representative-color selecting device additionally extracts a peak color existing close to the line segment connecting between the reference color and the dark color or between the representative color and a projection point of the representative color onto the line segment.

4. The image processing apparatus according to claim 1, further comprising a filtering device configured to creates a three-dimensionally filtering process for the histogram so that a coefficient of a distribution of the histogram becomes greater as nearer to a gravity center of the distribution, wherein the peak-color extracting device extracts the peak color from the histogram subjected to the three-dimensionally filtering process.

5. The image processing apparatus according to claim 1,
    wherein the representative-color selecting device determines whether a peak color having a lowest lightness in the plurality of peak colors can be regarded as black, and
    wherein when the peak color having the lowest lightness is regarded as black, the representative-color selecting device sets the peak color as the dark color, and when the peak color having the lowest lightness is not regarded as black, the representative-color selecting device sets a black color as the dark color.

6. The image processing apparatus according to claim 1, wherein the reference color is a color of a paper on which the input image is formed.

7. A method for processing an image, comprising:
    producing a histogram in a color space from an input image;

extracting a plurality of peak colors having a local maximum frequency in the histogram;

determining whether to unify the extracted plurality of peak colors, based on a feature amount of the extracted plurality of peak colors, the feature amount comprising a lightness difference among the extracted plurality of peak colors and directions of vectors in the color space, the vectors each showing a shortest distance from one of the plurality of peak colors to a line segment connecting between a reference color and a dark color;

selecting a peak color as a representative color among the extracted plurality of peak colors when the extracted plurality of peak colors are unified; and replacing a color of each pixel in the input image by the representative color.

8. A non-transitory computer readable medium storing a program causing a computer to execute a process for an image in an image processing apparatus, the process comprising:

producing a histogram in a color space from an input image;

extracting a plurality of peak colors having a local maximum frequency in the histogram;

determining whether to unify the extracted plurality of peak colors, based on a feature amount of the extracted plurality of peak colors, the feature amount comprising a lightness difference among the extracted plurality of peak colors and directions of vectors in the color space, the vectors each showing a shortest distance from one of the plurality of peak colors to a line segment connecting between a reference color and a dark color;

selecting a peak color as a representative color among the extracted plurality of peak colors when the extracted plurality of peak colors are unified; and replacing a color of each pixel in the input image by the representative color.

* * * * *